United States Patent

Bodnaras

Patent Number: 5,741,466
Date of Patent: Apr. 21, 1998

[54] MULTIPHASE STAGED PASSIVE REACTOR

[75] Inventor: George Bodnaras, Hillarys, Australia

[73] Assignee: Atomaer Pty Ltd, Perth, Australia

[21] Appl. No.: 553,623

[22] PCT Filed: Jun. 3, 1994

[86] PCT No.: PCT/AU94/00299

§ 371 Date: Mar. 19, 1996

§ 102(e) Date: Mar. 19, 1996

[87] PCT Pub. No.: WO94/29017

PCT Pub. Date: Dec. 22, 1994

[30] Foreign Application Priority Data

Jun. 3, 1993 [AU] Australia ............... PL9180

[51] Int. Cl.$^6$ ............... B01J 19/24; B01F 5/00
[52] U.S. Cl. ............... 422/228; 261/79.2; 261/DIG. 72
[58] Field of Search ............... 422/189, 193, 422/224, 228, 255, 256, 261, 278; 261/112.2, 79.2, DIG. 72

[56] References Cited

U.S. PATENT DOCUMENTS

| | | | |
|---|---|---|---|
| 3,388,893 | 6/1968 | Hall | 422/255 |
| 3,856,270 | 12/1974 | Hemker | 259/4 |
| 3,908,702 | 9/1975 | Klosse et al. | 138/42 |
| 4,179,222 | 12/1979 | Strom et al. | 366/337 |
| 4,438,075 | 3/1984 | von Branchel et al. | 422/189 |
| 4,668,441 | 5/1987 | Hess et al. | 261/79.2 |
| 5,185,106 | 2/1993 | Chen et al. | 261/112.2 |
| 5,188,773 | 2/1993 | Chen et al. | 261/112.2 |
| 5,411,710 | 5/1995 | Iwasyk | 422/137 |
| 5,437,784 | 8/1995 | Meinecke et al. | 209/170 |
| 5,534,328 | 7/1996 | Ashmead et al. | 428/166 |
| 5,540,900 | 7/1996 | Poncet | 422/225 |
| 5,595,712 | 1/1997 | Harbester et al. | 422/129 |

FOREIGN PATENT DOCUMENTS

| | | |
|---|---|---|
| A-23618/88 | 6/1989 | Australia . |
| 0045558 | 2/1982 | European Pat. Off. . |
| 0194812 | 9/1986 | European Pat. Off. . |
| 0389201 | 9/1990 | European Pat. Off. . |
| 1461788 | 12/1966 | France . |
| 522673 | 4/1931 | Germany . |
| 2051597 | 1/1981 | United Kingdom . |

Primary Examiner—Nina Bhat
Attorney, Agent, or Firm—Michael, Best & Friedrich LLP

[57] ABSTRACT

A multi-phase staged passive reactor (10) for promoting interphasic interaction of a first substance in a liquid phase with a second substance in a non-miscible liquid phase, a solid phase or a gaseous phase. The reactor comprises a plurality of stages (C, D and E) which define a flow path for the substances in different phases. Each stage is shaped to define a substantially curved flow path (12) having a center of curvature located to one side of the flow path (12). Thus, for example, stages (D) and (E) have a respective center of curvature (14, 16), on opposite sides of the flow path (12) whereby, in use, as the substances flow through the reactor (10) particles of the second substance are forced to migrate through the first substance, first in one direction and then in substantially the reverse direction due to an inertial field of changing direction thus generated. Due to the differences in the relative densities of the respective phases, differential inertial forces are exerted on each phase as the mixture flows along the general flow direction of flow path (12) the interphasic interaction thus produced includes both mechanical interaction due to, for example, collisions and energy transfer, as well as chemical reactions due to, for example, oxidation and ion-exchange. There are no moving parts in the reactor (10) which is of relatively simple construction, and it is extremely efficient, achieving high reaction rates, high mass transfer rates and high mixing rates.

14 Claims, 3 Drawing Sheets

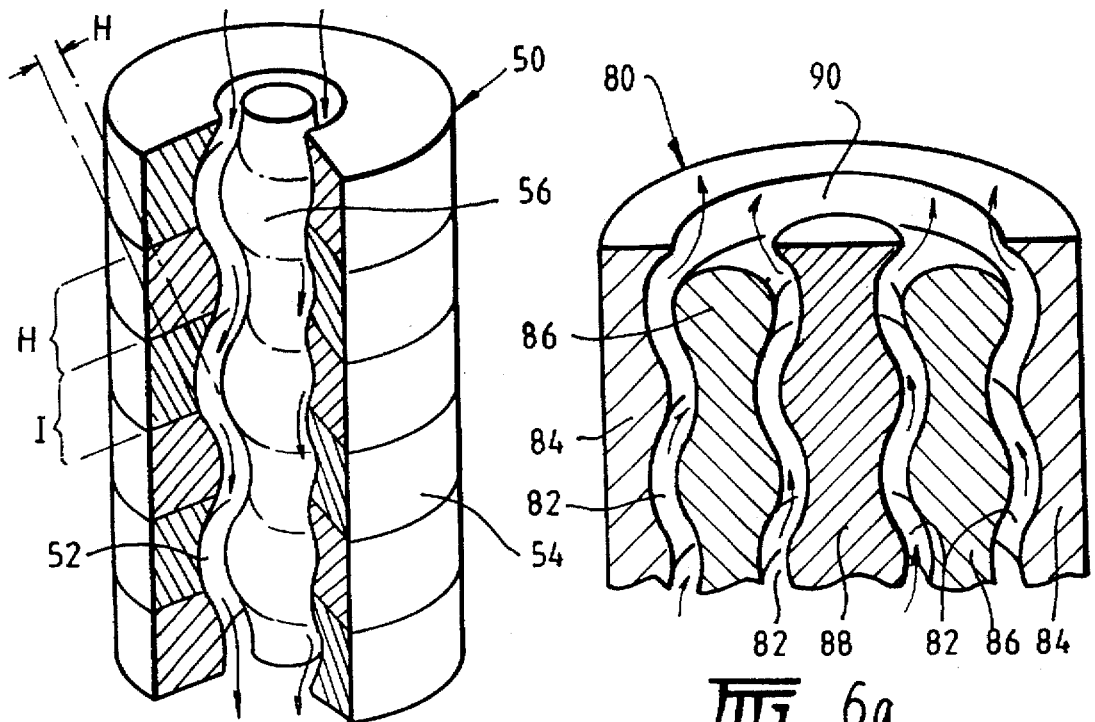
FIG. 4.
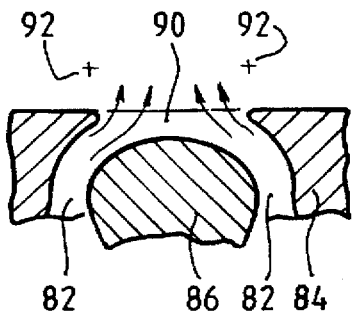
FIG. 6a.
FIG. 6b.
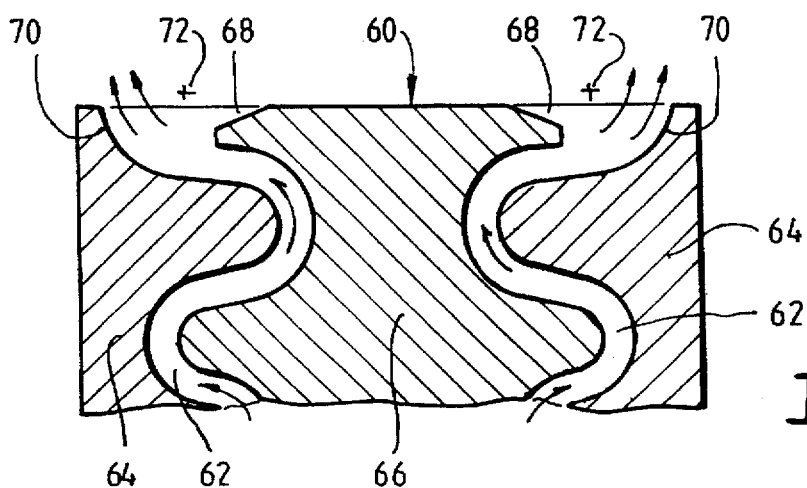
FIG. 5.

5,741,466

MULTIPHASE STAGED PASSIVE REACTOR

FIELD OF THE INVENTION

The present invention relates to a multiphase staged passive reactor for promoting interphasic interaction of a first substance in a liquid phase with a second substance in a non-miscible liquid phase, a solid phase or a gaseous phase. BACKGROUND TO THE INVENTION There are many industrial and commercial processes which require thorough mixing and/or dissolution of two or more phases, for example, aeration of a slurry to promote froth generation in a flotation process. Other applications which require the dissolution of a solid phase and/or gaseous phase in a liquid phase include fractional oxidation, pH control of alkali/acid solutions and/or slurries, leaching, ionic exchange processes, base metal leaching and gas scrubbing, heat exchange processes and solvent extraction.

The present invention was developed with a view to providing a multiphase staged passive reactor and method for promoting interphasic interaction between two or more such substances in different phases. Throughout the present specification the term "interphasic interaction" is employed to describe any interaction between two or more phases, including mechanical interaction due to, for example, collisions, shearing, friction, compression, extrusion and energy transfer, as well as chemical reactions due to, for example, oxidation, reduction, saturation, ion-exchange and dissolution, and where the phases that interact are characterised by different relative densities.

SUMMARY OF THE INVENTION

According to one aspect of the present invention there is provided a multiphase staged passive reactor for producing interphasic interaction of a first substance in a liquid phase with a second substance in a non-miscible liquid phase, a solid phase or a gaseous phase, at least one stage having only two facing surfaces defining the flow path, and wherein the phases of said first and second substances respectively are characterised by different relative densities, the reactor comprising:

a plurality of stages defining a flow path for the first and second substances, each stage being shaped to define a substantially curved flow path having a centre of curvature located to one side of the flow path, and wherein adjacent stages have a respective centre of curvature on opposite sides of the flow path whereby, in use, as the substances flow through the reactor particles of the second substance are forced to migrate through the first substance, first in one direction and then in substantially the reverse direction to promote interphasic interaction.

The curvature at a point on a plane curve measures the rate of change (at the point) in an angle which the tangent makes with a fixed axis, relative to an arc length of the curve. The curvature is the reciprocal of the radius of curvature, which is the radius of a circle which touches the curve (on the concave side) at the point in question. The circle is the circle of curvature, and its centre is the centre of curvature of the curve at that point. Therefore, unless the curve follows the circumference of the circle of curvature, the centre of curvature will change at different points along the curve. Hence, the centres of curvature of the flow path located to one side may define a locus of centres of curvature. It is to be understood that the reference to the substantially curved flow path having "a centre of curvature located to one side of the flow path" is intended to mean at least one centre of curvature located to one side of the flow path, as there may be more than one centre of curvature for the substantially curved flow path defined by each stage of the reactor.

Typically the flow path defined by each stage is of substantially similar shape, unless otherwise required by the process.

Preferably each stage is shaped to define a smoothly curved flow path wherein turbulent eddies in the flow path of the substances are substantially eliminated or at least minimised. Obviously dissolution of more than one substance of a different phase, with the first substance in a liquid phase can be performed by the reactor, for example, the dissolution of a second substance in a solid phase and a third substance in a gaseous phase with the first substance in a liquid phase.

In one form of the invention the flow path is defined by a generally cylindrical channel formed between facing surfaces of an outer shell of the reactor and an inner core. Advantageously the outer shell of the reactor comprises a plurality of substantially identical shell sections joined end to end, and the inner core comprises a plurality of core sections joined end to end.

In another form of the invention the flow path is defined by a corrugated channel formed between a first corrugated surface and a second corrugated surface facing the first corrugated surface, with the respective crests and troughs of the first and second corrugated surfaces being substantially aligned.

According to another aspect of the present invention there is provided a method of promoting interphasic interaction of a first substance in a liquid phase with a second substance in a non-miscible liquid phase, a solid phase or a gaseous phase, and wherein the phases of said first and second substances respectively are characterised by different relative densities, the method comprising:

forcing the first and second substances along a substantially curved multistage flow path, each stage being shaped to define a curved flow path having a centre of curvature located to one side of the flow path, at least one stage having only two facing surfaces defining the flow path, and wherein adjacent stages have a respective centre of curvature on opposite sides of the flow path whereby, in use, as the substances flow through the flow path particles of the second substance are forced to migrate through the first substance, first in one direction and then in substantially the reverse direction to promote interphasic interaction.

BRIEF DESCRIPTION OF THE DRAWINGS

In order to facilitate a better appreciation of the nature of the invention, several embodiments of the multiphase staged passive reactor will now be described in detail, by way of example only, with reference to the accompanying drawings, in which:

FIG. 4 is a partial cut-away perspective view of a fourth embodiment of the multiphase staged passive reactor of the invention;

FIG. 5 is a section view through a variation of the embodiment illustrated in FIG. 4;

FIGS. 6(a) and (b) are section views through a further variation of the embodiment illustrated in FIG. 4; and, FIG. 7 is a section view through a fifth embodiment of the multiphase staged passive reactor of the invention.

DETAILED DESCRIPTION OF PREFERRED EMBODIMENTS

Figure 1:
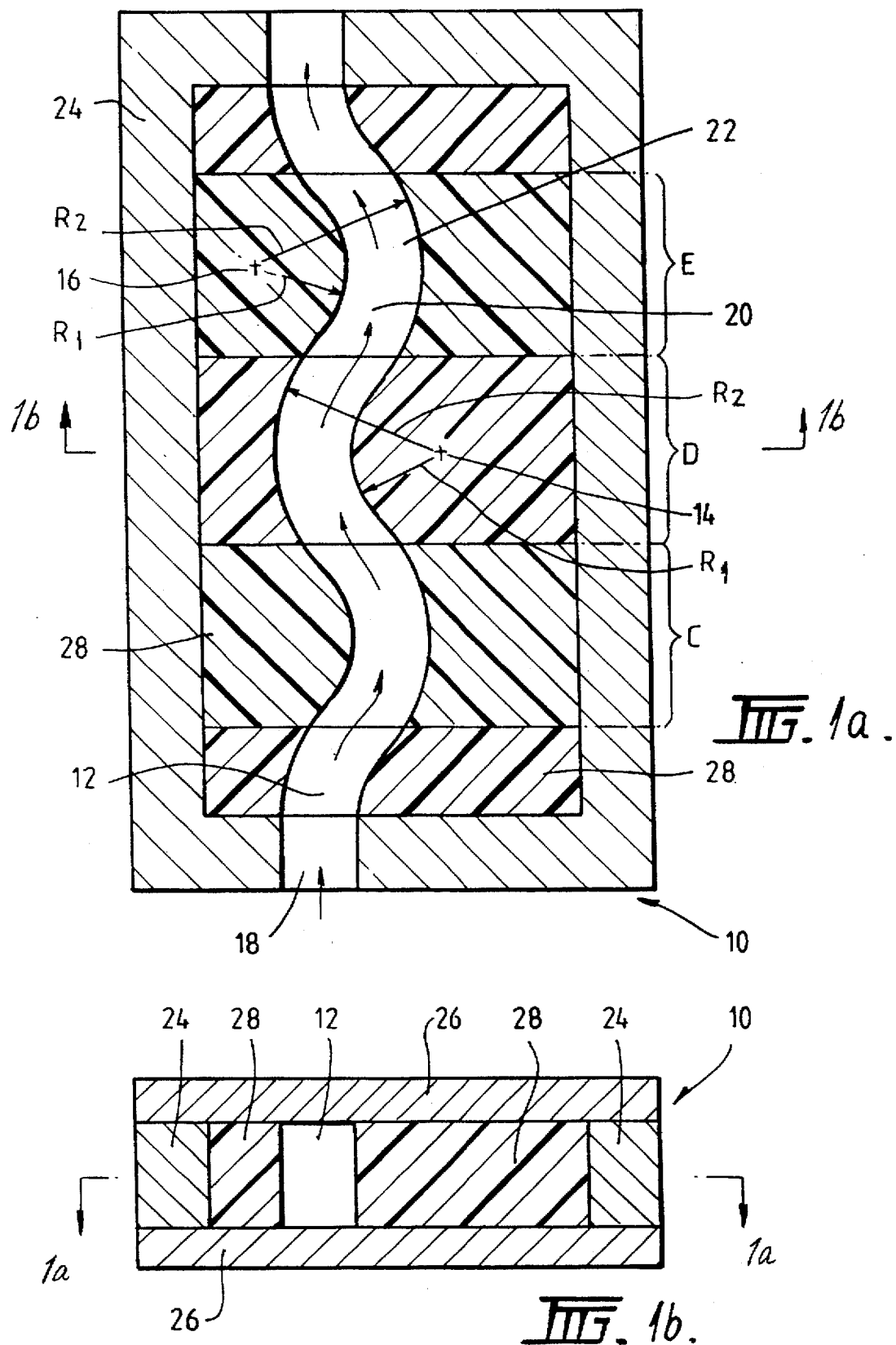
FIG. 1(a) is a section view of a first embodiment of the multiphase staged passive reactor of the invention through the line B—B in FIG. 1(b)
FIG. 1(b) is a different section view through the line A—A of the multiphase staged passive reactor of FIG. 1(a)

FIG. 1 illustrates a first embodiment 10 of the multiphase staged passive reactor which comprises a plurality of stages, in this case three stages labelled C, D and E in FIG. 1(a), which define a flow path for two or more substances in different phases. Each stage C, D and E is shaped to define a substantially curved flow path 12 having a centre of curvature located to one side of the flow path 12. As can be seen most clearly in FIG. 1(a) adjacent stages, for example, stages D and E have a respective centre of curvature 14, 16 on opposite sides of the flow path 12 whereby, in use, as the substances flow through the reactor 10 particles of the second substance (which is the less dense phase) are forced to migrate through the first substance, first in one direction and then in substantially the reverse direction due to an inertial field of changing direction thus generated.

In a typical application where, for example, three phases are present, ie., liquid, gas and solid particles, all three phases are pumped into the reactor through an input port 18. The relative proportions of the gas and solid particles to the liquid phase, and the velocity of the mixture are selected to produce a substantially streamline flow of the liquid in the general flow direction of the flow path 12. Due to the differences in the relative densities of the respective phases, differential inertial forces are exerted on each phase as the mixture flows along the general flow direction of flow path 12. Thus, as the substances flow through stage D of the reactor the solid particles migrate towards the outer side of bend 20 having a radius of curvature of $R_2$, in the general direction away from the centre of curvature Simultaneously, the gas is forced to migrate towards the inner side of the bend 20 having a radius of curvature $R_1$, in the general direction towards the centre of curvature 14. The liquid phase substance will have the tendency to follow the streamlines of the general flow direction towards the next bend 22 in the adjacent stage E.

As the substances flow through the next stage E of the reactor 10 the inertial forces change direction, so that the solid particles now migrate in substantially the reverse direction towards the outer side of bend 22 having a radius of curvature $R_2$, and away from the general direction of the new centre of curvature 16 of stage E. Similarly, the gas is now forced to migrate towards the inner side of bend 22 in the general direction of the centre of curvature 16. The cross-migration of the solid and gaseous phases through the liquid phase, as all three substances traverse each stage of the reactor 12, generates strong and repetitive interactions between all three phases. Hence, on the one hand the gas is broken into fine bubbles by the forced migration of solids through the gas space and the bubbles are further extruded into fine filaments and platelets by their continued migration through the liquid phase, and on the other hand the migrating solid particles are exposed to high shear flow and inter-granular friction. Significant attrition of the solid particles is present on the walls of the flow chamber and due to impingement on opposite sides of the bends in the flow path. In this way, none of the phases present are at any time permitted to predominantly agglomerate and remain so in any portion within the general flow volume thereby generating large gas particles and inactive volumes. Nor are the phases permitted to segregate in any particular part of the flow thereby preventing the repetitive process of multiphase interactions, which otherwise predominate every time the flow path changes the general position of its centre of curvature.

Another phenomena which may occur in the reactor to promote interphasic interaction is the formation of a thin film of gas on the convex portions of the walls of the flow chamber. As gas particles are forced to migrate to the inner side of the bend 20, (convex wall portion), some gas particles adhere to the side wall of the flow chamber. These gas particles are extruded or smeared along the side wall to form a thin film of gas which is forced to break up and migrate through the liquid phase towards the opposite convex side wall of the next adjacent stage. The thin film separates from the side wall at approximately the point of inflexion, where one stage is joined to the next.

In the multiphase staged passive reactor 10 of FIG. 1, each stage is shaped to define a smoothly curved flow path wherein turbulent eddies in the flow of substances can be substantially eliminated, or at least minimised. Any such recirculation eddies and/or turbulent regions would tend to have a deleterious affect on the efficient operation of the reactor 10, by causing segregation of the different phases, producing non-quiescent flow and/or energy losses in the vortices formed. In this embodiment the flow path is defined by a corrugated channel of rectangular cross section with a predetermined height to depth ratio (H:W). The side walls of the flow chamber thus formed follow a smooth curved line such that the virtual centres of curvature or such loci of centres of curvature alternate in position from one side of the flow path to the other in a manner shown, for example, for the centres of curvature 14, 16 of stages D and E respectively. In this way, alternate changes in the direction of the inertial field are achieved without discontinuities in the flow pattern and no spurious recirculation eddies and/or regions are generated in the flow volume. Therefore, full control over the mechanical and chemical interactions produced by the cross-interference flows can be achieved.

The embodiment of FIG. 1 may be constructed using a rectangular steel frame 24 forming the side walls of a housing for the reactor, and a pair of steel plates 26 forming the top and bottom walls of the reactor 10. The flow chamber within the reactor may be formed by two blocks of a suitable rigid material, for example, polyurethane cut to the required shape. Alternatively, each stage of the reactor 10 may be formed of a plurality of polyurethane segments located side by side within the frame 24 and between the top and bottom plates 26. This latter construction has the advantage that any stage in the reactor can be replaced or repaired separately if it should become damaged or worn.

Figure 2:
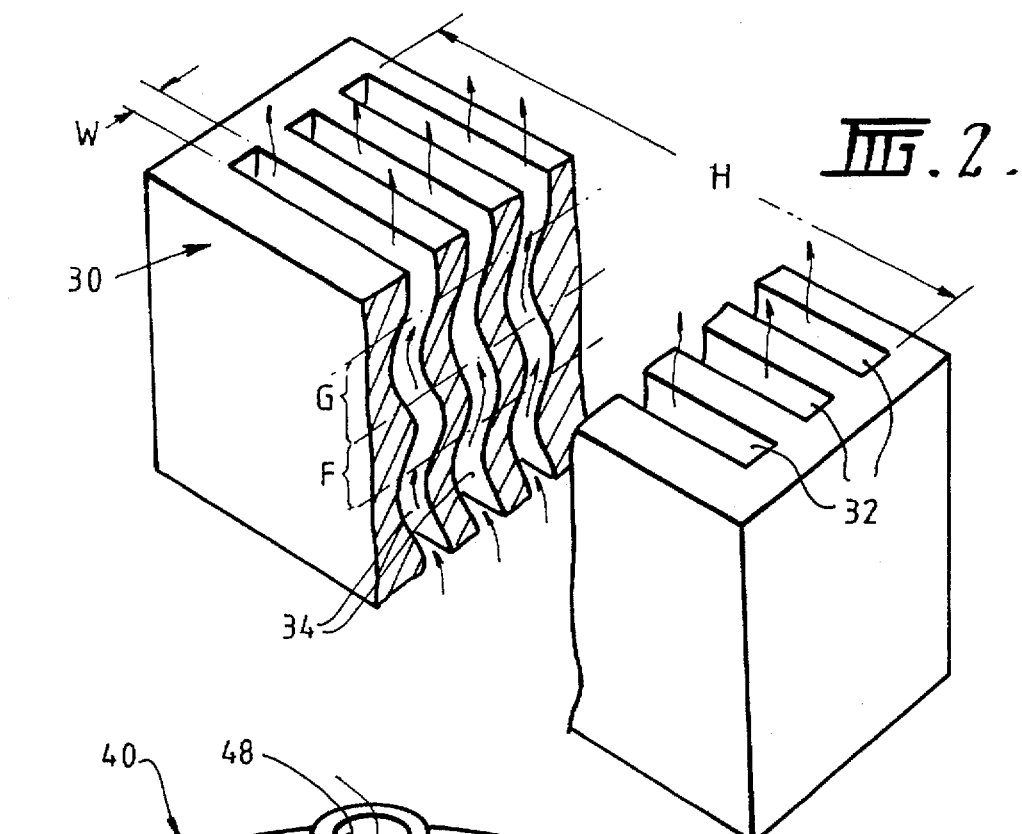
FIG. 2 is a partial cut-away perspective view of a second embodiment of the multiphase staged passive reactor.

FIG. 2 illustrates a second embodiment 30 of the multiphase staged passive reactor according to the invention. In this embodiment a plurality of corrugated channels 32 are provided similar in shape to the corrugated channel of FIG. 1. In the reactor 30 the channel depth or height H is large relative to the channel width W, and a plurality of similar channels are provided running parallel to each other to accommodate larger flow rates of the multiphase mixture of substances. Substantially the same interphasic interaction and flow properties can be achieved with the reactor 30 as with the embodiment of FIG. 1 due to the inertial field of changing direction which is generated in the respective flow paths 34 of the channels 32. Each channel 32 comprises a plurality of stages, for example, stages F and G, defining a flow path for the substances through the reactor 30. As in the first embodiment, each stage is shaped to define a curved flow path having a centre of curvature located to one side of the flow path, and adjacent stages have a respective centre of curvature on opposite sides of the flow path. The centrifugal forces generated by the oscillating or wobbly flow of the multiphase mixture through the reactor 30 produce the same interphasic interaction due to cross-migration of the different phases in the liquid phase.

Figure 3:
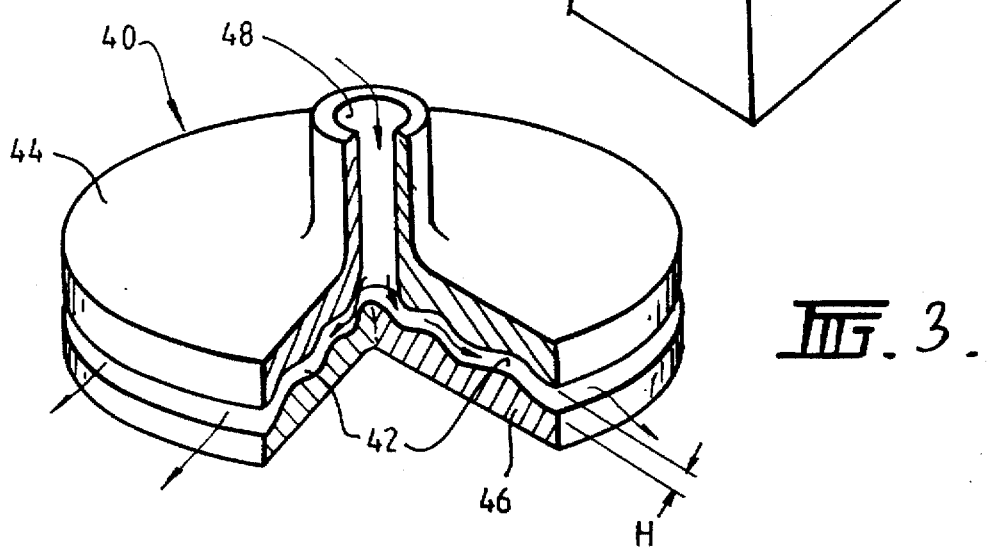
FIG. 3 is a partial cut-away perspective view of a third embodiment of the multiphase staged passive reactor.

FIG. 3 illustrates a third embodiment 40 of a multiphase staged passive reactor according to the invention in which the multiphase mixture of substances follows a radially directed flow path 42. The radially directed flow path 42 is defined between a first body 44 and a second body 46, the facing surfaces of the first and second bodies 44, 46 being provided with matching circular corrugations. The multiphase mixture flows into the gap between the first and second bodies 44, 46 via an axially mounted input port 48 in the first body 44. As the multiphase mixture flows outwards through the radially directed flow path 42 it passes through a plurality of circularly defined stages of increasing radius formed by the circular corrugations. As in the previous embodiments, each circular stage of the reactor 40 is shaped to define a substantially curved flow path having a centre of curvature located to one side of the radial flow path 42. Furthermore adjacent stages have a respective centre of curvature on opposite sides of the flow path 42 in order to generate an alternating inertial field as in the previous embodiments. Hence the reactor 40 is capable of achieving the same flow, mixing and interphasic interactions due to cross-migration in the flow path 42, as the previous embodiments in an axially symmetric fashion.

This embodiment of the multiphase reactor 40 has the added advantage that the height H of the flow chamber can be adjusted by moving the first and second bodies 44, 46 axially relative to each other to provide additional control over the general flow velocities involved in the generation of the inertial phenomena leading to interphasic interactions. Thus, changes in the flow path characteristics can be made to accommodate a certain amount of wear or change in flow rates, or the required inertial effects and cross-migration can be modified in response to changing process requirements.

The embodiment of FIG. 3 may have a particularly useful application in promoting heat exchange in a slurry, for example, heating of the green liquor in the Bayer process in an alumina refinery prior to digestion. In this application the flow of the multiphase mixture through the reactor is in the reverse direction to that illustrated in FIG. 3. In order to rapidly heat the slurry high temperature saturated steam is mixed with the slurry. The steam condenses and heat is transferred to the slurry. In order to promote interphasic interaction to accelerate heat exchange the steam and slurry are pumped through the multiphase reactor 40. As the gaseous phase water (steam) interacts with the slurry, and the saturated steam starts to condense, there is a significant reduction in the total volume of the multiphase mixture flowing through the reactor. This change in flow volume is readily accommodated in the design of the reactor 40, which due to its circular configuration is characterised by a significant differential in the flow volume that can be accommodated at the input compared to that at the output.

FIG. 4 illustrates a still further embodiment 50 of the multiphase staged' passive reactor according to the invention, in which a flow path 52 is defined by a generally annular channel of varying diameter formed between facing surfaces of an outer shell 54 of the reactor and an inner core 56. Typically, the outer shell 54 of the reactor is constructed from a plurality of substantially identical shell sections joined end to end, and the inner core 56 likewise is constructed from a plurality of core sections joined end to end and mounted coaxially on a central shaft or otherwise located and supported (not illustrated). The respective shell sections and core sections are arranged to form a plurality of stages, for example, stages H and I as illustrated in FIG. 4, to define the substantially curved flow path 52.

Each stage in the reactor 50 is shaped to define a curved flow path having a centre of curvature located to one side of the flow path 52, and adjacent stages have a respective centre of curvature on opposite sides of the flow path 52. Hence, the reactor 50 of this embodiment is also capable of producing the same kinds of interphasic interaction as the previous embodiments through the changing direction of the inertial field in the flow path 52, Advantageously the flow characteristics of the reactor 50 can be varied by repositioning the inner core 56 axially relative to the outer shell 54 to vary the flow gap between the respective facing surfaces of the inner core 56 and outer shell 54.

In each of the above described embodiments the curvature of each stage is substantially the seine as that of an adjacent stage although the respective centre of curvature is on opposite sides of the flow path. However in some applications it may be desirable for the curvature of the flow path to vary between stages. Variations in the curvature will produce acceleration and/or deceleration of the first and second substances in the direction of the flow path as they pass from one stage to the next. Such changes in velocity further promote interphasic interactions.

In an application where the reactor is required to discharge its flow directly into a relatively large volume of liquid or slurry, for the purpose of achieving a similar mixing, dissolution, dispersion or any of the other effects previously mentioned, the curvature of the flow path of the emerging phases can also be obtained without the presence of a physical wall on the convex side of the flow path. An arrangement of this type is illustrated in FIG. 5, which is a variation of the embodiment of FIG. 4. FIG. 5 is a section view through a multiphase staged passive reactor 60, in which a flow path 62 is also defined by a substantially annular channel of varying diameter formed between facing surfaces of an outer shell 64 and an inner core 66. The construction of the reactor 60 is similar to that of FIG. 4, however at the reactor discharge 68 the flow path is defined only by a concave wall 70 having a "virtual centre of curvature" 72 located in the volume of liquid adjacent the discharge 68. The absence of a convex wall at this stage of the reactor means that the less dense of the phases will migrate towards the virtual centre of curvature 72 into the liquid, governed by the same principle as in the completely enclosed stages.

A similar flow pattern at the reactor discharge can be achieved by terminating the reactor in the manner illustrated in FIG. 6. The reactor 80 of FIG. 6 is a further variation of that illustrated in FIG. 4, constructed with two concentric flow paths 82 defined by two substantially annular channels of varying diameter formed between facing surfaces of an outer shell 84 and an inner shell 86, and the inner shell 86 and an inner core 88 respectively. At the discharge 90 of the reactor there are no containing or boundary walls to shape the ensuing counter flows, as can be seen most clearly in FIG. 6(b). However the flow pattern is such that curved flow paths are formed with virtual centres of curvature 92 located in the liquid adjacent the discharge without the presence or need of such walls.

In both embodiments illustrated in FIGS. 5 and 6, when the less dense phase is emerging from close proximity to the convex wall of the previous stage, it will be forced to migrate towards the virtual centres of curvature at the discharge. When it finds no physical surface to migrate to as in the previous stages, and depending on the flow characteristics, ie., velocity and relative densities, it will be finely dispersed into the mass of liquid in the discharge volume.

In each of the above described embodiments the centres of curvature lie in a plane which is substantially perpendicular to the general flow direction of liquid along the flow path of the reactor. It is thought that this significantly inhibits the transmission of any turbulence that may form in one stage to an adjacent stage. The inertial field changes direction substantially perpendicularly to the general flow direction and is therefore substantially decoupled from the flow of liquid in the general flow direction. Hence, any eddies that may form in one stage are destroyed by the reversing of the inertial field in the next stage.

Now that several embodiments of the multiphase staged passive reactor according to the invention have been described in detail, it will be evident that the preferred embodiments of the reactor have a number of significant advantages, including the following:

(1) There are no moving parts and therefore it has relatively simple construction and is easy to maintain (2) The size of the reactor can be scaled up or down to suit any application (3) It is extremely efficient, enabling vastly improved interphasic interactions leading to substantial reductions in reagents to achieve similar or better results than the current processes (4) It is capable of processing high volumes (5) Very high reaction rates can be achieved due to high Reynolds numbers and mixing characteristics (6) High mass transfer rates are possible (7) High mixing rates occur leading to superior dispersion of one phase into the other (8) Substantial attritioning of the solid phase occurs on the outer boundary of each stage leading to surface cleaning and exposure of possible fresh solid reactants to the other leaching phases.

In order to illustrate the efficacy of the reactor, the application of a preferred embodiment to the process of gold leaching will be briefly described. A gold leaching process typically requires oxygenation of the slurry containing the gold-bearing ore and cyanide. By pumping the slurry through the passive reactor with oxygen gas the leaching process can be greatly enhanced, due to the vastly increased dissolution of the oxygen in the slurry. In addition, the high attrition rates achieved in the reactor due to the interphasic interactions of the solid ore particles exposes more of the gold to the cyanide and oxygen in the liquid phase. The high Reynold's numbers which are present create strong local mixing so that the boundary layer of the ore particles becomes insignificant. The combined effects of high shear and improved oxygenation produce an astonishing increase in the efficiency of the leaching process.

Using a sulphide type gold-bearing ore, tests indicate that 65% of the total available gold is dissolved in solution after only 1.0 second residence time, which is the time that the slurry takes to pass through the reactor. An additional 30% of the total available gold is dissolved in solution after a further twelve hours residence time in the existing plant. This compares with a maximum of 65 to 75% recovery of the total available gold using conventional methods of oxygenation and processing for leaching. Hence, the multiphase staged passive reactor is more than 36,000 times more efficient in achieving 65% dissolution of the total available gold.

Figure 7:
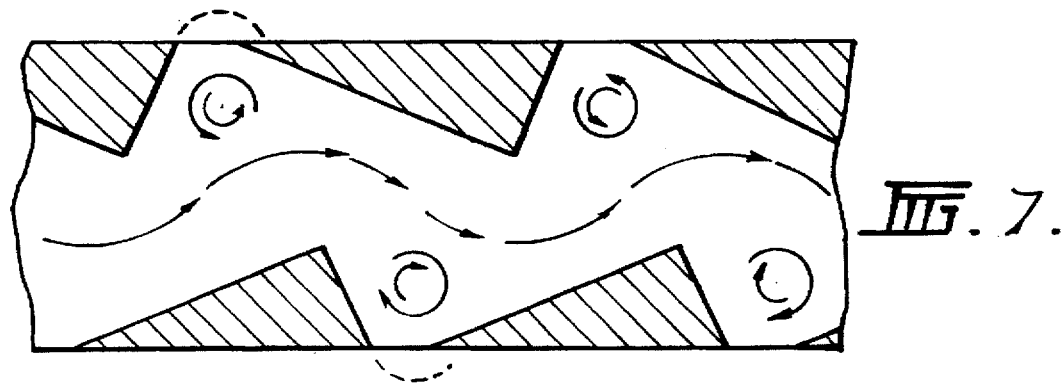

Now that various embodiments of the multiphase staged passive reactor have been described in detail it will be apparent to persons skilled in the relevant arts that numerous variations and modifications can be made, in addition to those already described, without departing from the basic inventive concepts. For example, in each of the illustrated embodiments the flow path is defined between substantially smoothly curved surfaces to avoid discontinuities in the flow pattern and to minimise turbulent eddies. However, a substantially curved flow path capable of generating an alternating inertial field can also be formed using stepped walls, as illustrated in FIG. 7, although this would be less efficient than the described embodiments. Discontinuities in the walls of the flow chamber will tend to produce recirculation eddies and vortices in which, for example, an agglomeration of solid particles may be trapped producing high local wear rates as well as energy losses. However, it is to be understood that the invention is not limited to structures having smoothly curved flow chambers, although this is the preferred form of the invention.

Although each of the illustrated embodiments is constructed with three or more stages, it will be clear that the reactor will function with as few as two adjacent stages, even if the flow path in one of these stages has a virtual centre of curvature. In addition, it will be apparent that any two or more distinct phases can be pumped through the reactor to produce interphasic reactions, provided at least one of the phases is a liquid. For example two liquid phases, one of which does not readily mix with the other due to differences in surface tension, density, etc. Solid particles, for example sand particles may be added to the mixture to promote interphasic interaction. Furthermore, different phases may flow through the reactor in opposite directions along the same flow path. All such variations and modifications are to be considered within the scope of the present invention, the nature of which is to be determined from the foregoing description and the appended claims.

The claims defining the invention are as follows:

1. A method of promoting interphasic interaction of a first substance in a liquid phase with a second substance in a non-miscible liquid phase, a solid phase or a gaseous phase, and wherein the phases of said first and second substances respectively are characterized by different relative densities, the method comprising:

forcing the first and second substances along a substantially curved multistage flow path, each stage being shaped to define a curved flow path having a centre of curvature located to one side of the flow path, at least one stage having only two facing boundary surfaces defining the flow path, and wherein adjacent stages have a respective centre of curvature on opposite sides of the flow path whereby, in use, as the substances flow through the flow path they are subject to an inertial field of changing direction so that particles of the second substance are forced to migrate through the first substance, first in one direction and then in substantially the reverse direction to promote interphasic interaction due to relative movement and cross migration of the phases which causes the phases to be extruded and accelerated to form fine filaments and platelets thereby increasing interphasic contact surfaces and exposing the phases to high shear flow and intergranular friction.

2. A method of promoting interphasic interaction as claimed in claim 1, wherein both the first and second substances are forced through the flow path in the same direction of flow.

3. A method of promoting interphasic interaction of a first substance in a liquid phase with a second substance in a non-miscible liquid phase, a solid phase or a gaseous phase, wherein the phases of said first and second substances respectively are characterized by different relative densities, the method comprising:

forcing the first and second substances to flow cocurrently along a flow path through a passive reactor under the influence of a controlled pressure differential between an inlet and an outlet of the passive reactor, and subjecting said cocurrent flow to an inertial field of chancing direction, and wherein said cocurrent flow is substantially free of recirculation flow patterns whereby, in use, interphasic interaction of the first and second substances is enhanced due to relative movement and/or cross migration of the phases which causes the phases to be extruded and/or accelerated to form fine filaments and platelets thereby increasing interphasic contact surfaces and exposing the phases to high shear flow and intergranular friction.

4. A method of promoting interphasic interaction as claimed in claim 3, wherein the pressure differential between the inlet and the outlet of the passive reactor can be controlled by altering the flow rate of each substance such that the desired interphasic interaction can be achieved.

5. A multiphase staged passive reactor for producing interphasic interaction of a first substance in a liquid phase with a second substance in a non-miscible liquid phase, a solid phase or a gaseous phase, and wherein the phases of said first and second substances respectively are characterized by different relative densities, the reactor comprising:

a plurality of stages defining a flow path for the first and second substances, each stage being shaped to define a substantially curved flow path having a centre of curvature located to one side of the flow path, at least one stage having only two facing boundary surfaces defining the flow path, and wherein adjacent stages have a respective centre of curvature on opposite sides of the flow path whereby, in use, as the substances are forced to flow cocurrently through the reactor they are subject to an inertial field of changing direction so that particles of the second substance are forced to migrate through the first substance, first in one direction and then in substantially the reverse direction to promote interphasic interaction due to relative movement and cross migration of the phases which causes the phases to be extruded and accelerated to form fine filaments and platelets, thereby increasing interphasic contact surfaces and exposing the phases to high shear flow and intergranular friction.

6. A multiphase staged passive reactor as defined in claim 5, wherein the flow path defined by each stage is of substantially similar shape.

7. A multiphase staged passive reactor as defined in claim 5, wherein each stage is shaped to define a smoothly curved flow path wherein turbulent eddies in the flow path of the substances are substantially eliminated or at least minimised.

8. A multiphase staged passive reactor as defined in claim 7, wherein the centre of curvature of each stage lies in a plane which is substantially perpendicular to a general flow direction along said flow path.

9. A multiphase staged passive reactor as defined in claim 5, wherein the flow path is defined by a substantially annular channel of varying diameter formed between facing surfaces of an outer shell of the reactor and an inner core.

10. A multiphase staged passive reactor as defined in claim 9, wherein the outer shell of the reactor comprises a plurality of shell sections joined end to end, and the inner core comprises a plurality of core sections joined end to end.

11. A multiphase staged passive reactor as defined in claim 9, wherein the reactor discharges its flow directly into a volume of liquid and wherein the flow path at the reactor discharge has a virtual centre of curvature located in the volume of liquid whereby, in use, the less dense substance will be forced to migrate towards the virtual centre of curvature at the discharge and thereby dispersed into the volume of liquid.

12. A multiphase staged passive reactor as defined in claim 5, wherein the flow path is defined by a corrugated channel formed between a first corrugated surface and a second corrugated surface facing the first corrugated surface, with the respective crests and troughs of the first and second corrugated surfaces being substantially aligned.

13. A multiphase staged passive reactor as defined in claim 12, wherein said flow path is one of a plurality of flow paths defined by a corresponding plurality of said corrugated channels.

14. A multiphase staged passive reactor as defined in claim 5, wherein the second substance is in a gaseous phase and wherein as the second substance is forced to migrate to a convex wall portion defining the flow path some gas particles of the second substance adhere to the convex wall portion and are extruded to form a thin film of gas on the convex wall portion.

* * * * *